(12) United States Patent
Smith et al.

(10) Patent No.: US 7,431,245 B2
(45) Date of Patent: Oct. 7, 2008

(54) RAPID EXCHANGE SYSTEM FOR TESTING WIRELESS NETWORKS

(75) Inventors: Steven L. Smith, Buford, GA (US);
Chris R. Radosta, Cumming, GA (US);
Mark Horton, Suwanee, GA (US);
Daniel Silvernale, Roswell, GA (US);
Christopher T. Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 299 days.

(21) Appl. No.: 10/950,187

(22) Filed: Sep. 24, 2004

(65) Prior Publication Data
US 2005/0072888 A1    Apr. 7, 2005

Related U.S. Application Data

(60) Provisional application No. 60/505,822, filed on Sep. 24, 2003.

(51) Int. Cl.
*G12B 9/00* (2006.01)
*H01R 13/60* (2006.01)

(52) U.S. Cl. ............... 248/27.1; 248/309.2; 248/316.8; 439/374; 439/527; 312/245; 312/333

(58) Field of Classification Search ............... 248/27.1, 248/551, 552, 612, 680, 309.1, 309.2, 230.1, 248/316.8, 547; 312/264, 265, 333, 348, 312/245; 361/682, 683; 439/527, 248, 374, 439/929, 532, 533
See application file for complete search history.

(56) References Cited

U.S. PATENT DOCUMENTS 2,789,024 A * 4/1957 Heisler ....................... 312/333
3,264,601 A * 8/1966 Hartholz ..................... 439/701
3,822,049 A   7/1974 Saunders
4,079,604 A * 3/1978 Anderegg ..................... 70/58

(Continued)

FOREIGN PATENT DOCUMENTS

EP    0 673 804 A1    3/1995

(Continued)

OTHER PUBLICATIONS

International Search Report and Written Opinion dated Jan. 17, 2006 for PCT/US2004/031618 filed Sep. 24, 2004.

(Continued)

*Primary Examiner*—Amy J. Sterling
*Assistant Examiner*—Tan Le
(74) *Attorney, Agent, or Firm*—Alston & Bird LLP (57) ABSTRACT

Various embodiments of the invention are directed to a system for removably mounting a signal testing unit to a suitable vehicle surface, and optionally providing for an electrical connector to a power source, GPS antenna, and cellular antennas such that moving a signal testing unit from one vehicle to another can be accomplished more easily. The mounting system includes a connector plate that is attachable to a vehicle surface and includes a plurality of guide pins extending perpendicularly from the connector plate. Guide pin receivers are attached to at least two faces of a signal testing unit and, when each guide pin receiver slidably engages each of the guide pins, movement of the signal testing unit relative to the connector plate is prevented.

4 Claims, 12 Drawing Sheets

U.S. PATENT DOCUMENTS

| | | | | |
|---|---|---|---|---|
| 4,085,369 | A | * | 4/1978 | Burke .......................... 455/345 |
| 4,113,217 | A | | 9/1978 | O'Connell |
| 4,196,624 | A | * | 4/1980 | Willenbrock et al. ...... 73/304 R |
| 4,589,557 | A | | 5/1986 | Bollmann |
| 4,627,589 | A | * | 12/1986 | Hotsumi ................ 248/346.03 |
| 4,634,009 | A | * | 1/1987 | Gassaway ....................... 211/4 |
| 4,714,303 | A | | 12/1987 | Suzuki et al. |
| 4,858,878 | A | * | 8/1989 | Gassaway ................... 248/551 |
| 4,939,622 | A | * | 7/1990 | Weiss et al. ................. 361/727 |
| 4,957,264 | A | * | 9/1990 | Hakanen .................... 248/510 |
| 4,977,399 | A | | 12/1990 | Price et al. |
| 5,007,608 | A | | 4/1991 | Carroll, Jr. |
| 5,031,074 | A | | 7/1991 | Ravid |
| 5,095,500 | A | | 3/1992 | Tayloe et al. |
| 5,193,890 | A | | 3/1993 | Robertson, Jr. et al. |
| 5,398,276 | A | | 3/1995 | Lemke et al. |
| 5,481,588 | A | | 1/1996 | Rickli et al. |
| 5,510,955 | A | * | 4/1996 | Taesang ...................... 361/685 |
| 5,561,839 | A | | 10/1996 | Österberg et al. |
| 5,571,256 | A | * | 11/1996 | Good et al. .................... 211/26 |
| 5,599,080 | A | | 2/1997 | Ho |
| 5,752,164 | A | | 5/1998 | Jones |
| 5,946,612 | A | | 8/1999 | Johansson |
| 5,987,306 | A | | 11/1999 | Nilsen et al. |
| 5,991,622 | A | | 11/1999 | Henry, Jr. |
| 6,272,337 | B1 | | 8/2001 | Mount et al. |
| 6,315,255 | B1 | | 11/2001 | Chan et al. |
| 6,377,445 | B1 | | 4/2002 | Davis et al. |
| 6,400,690 | B1 | | 6/2002 | Liu et al. |
| 6,402,111 | B1 | | 6/2002 | Stewart et al. |
| 6,443,544 | B1 | * | 9/2002 | Wolf et al. ............... 312/348.1 |
| 6,449,485 | B1 | | 9/2002 | Anzil |
| 6,590,151 | B1 | * | 7/2003 | Merk et al. ................. 174/365 |
| 6,603,966 | B1 | | 8/2003 | Sheffield |
| 6,702,604 | B1 | | 3/2004 | Moscovitch |
| 2001/0004157 | A1 | | 6/2001 | Lance et al. |
| 2002/0029108 | A1 | | 3/2002 | Liu et al. |
| 2003/0014286 | A1 | | 1/2003 | Cappellini |

FOREIGN PATENT DOCUMENTS

| | | |
|---|---|---|
| EP | 0 977 450 A2 | 2/2000 |
| FR | 2 725 311 A1 | 9/1994 |
| FR | 2 725 311 A1 | 9/1994 |
| FR | 2 721 363 A1 | 6/1995 |
| JP | 06060229 | 9/1995 |

OTHER PUBLICATIONS

International Search Report and Written Opinion dated Dec. 21, 2005 for PCT/US2005/031614 filed Feb. 9, 2005.

Second Written Opinion for PCT/US2004/031618 filed Sep. 24, 2004.

International Search Report for PCT/US2004/031618 filed Sep. 24, 2004.

TEMS™ Automatic WCDMA Take Control of Your Mobile Internet Quality of Service, Copyright 2001, pp. 1-2, (available at http:\\www.ericsson.com/services/tems/downloads/ds_automatic_wcdma.pdf), Publication AE/LZT 123 6694, R1.

TEMS™ Drive Tester CDMA An Innovative Drive Test Solution, Copyright 2003, pp. 1-4, (available at http:\\www.ericsson.com/service/internet/picov/get?DocNo=28701-FAP9010100), Publication AE/LZT 123 7307, R3.

TEMS™ Automatic WCDMA Take Control of Your Mobile Internet Quality of Service, Copyright 2001, pp. 1-2, www.ericsson.com, Publication AE/LZT 123 6694 R1.

TEMS™ Drive Tester CDMA An Innovative Drive Test Solution, (Copyright 2003), pp. 1-4, www.ericsson.com/tems, Publication AE/LZT 123 7307, R3.

Lisa Sigler, Assess Speech Quality with PESQ, now in TEMS™ Automatic, date unknown, p. 1 of 1.

TEMS™ Automatic Streamlined Operations and Improved QoS GSM/GPRS, CDMA, and TDMA, Copyright 2004, pp. 1-4, www.ericsson.com/tems, Publication 287 01-FAP 901 0409 B.

Ericsson, TEMS™—Making Wireless Better, APAC Workshop, Sep. 2004, pp. 1-17.

TechNotes: Tools for Precision-A Tool Kit to Optimize WCDMA Networks, date unknown; p. 1 of 1 numbered p. 46, www.ericsson.com/tems.

Lisa Sigler, TEMS™ News, An Ericsson Newsletter, Jun. 2003 No. 2, pp. 1-8.

TEMS™ News, An Ericsson Newsletter, Q2 2004 No. 2 pp. 1-8.

TEMS™ News, An Ericsson Newsletter, Q3 2004, No. 3, pp. 1-8.

On The New World of Communication Magazine, Mar. 2002, pp. 1-50.

TEMS™ Tech Support: TEMS Automatic GSM Take Control Of Your Mobile Internet Quality Of Service, date unknown, pp. 1-3 www.ericsson.com/services/tems/support/sup_automatic_gsm.shtml.

TEMS™ Automatic Making Wireless Better Take Control Of Your Mobile Internet Quality Of Service, date unknown, pp. 1-2, www.ericsson.com/services/tems/cdma/automatic-cdma.shtml.

TEMS™ Tech Support: TEMS Drivetester CDMA Making Wireless Better: Instantly Isolate Network Trouble Spots, date unknown, pp. 1-2 www.ericsson.com/services/tems/support/drivetester/sup_drivetester_cdma.shtml.

TEMS™ Tech Support: TEMS Drivetester GSM/TDMA Making Wireless Better Instantly Isolate Network Trouble Spots, date unknown, pp. 1-2, www.ericsson.com/services/tems/support/drivetester/sup_drivetester_gsnm_tdma.shtml.

TEMS™ Tech Support: TEMS Linkplanner Making Wireless Better, FAQ's, date unknown, pp. 1-2, www.ericsson.com/services/tems/support/linkplanner/sup_linkplanner_faq_import.shtml.

TEMS™ Tech Support: TEMS Linkplanner Making Wireless Better FAQ's, Map Data, date unknown, p. 1 of 1. www.ericsson.com/services/tems/support/linplanner/sup_linkplanner_faq_mapdata.shtml.

TEMS™ Tech Support TEMS Linkplanner: Making Wireless Better FAQ's, General, date unknown, p. 1 of 1, www.ericsson.com/services/tems/support/linkplanner/sup_linkplanner_faq_general.shtml.

TEMS™ Drivetester CDMA2000 2.0 An Innovative Drive Test Slution for CDMA Networks, date unknown, p. 1 of 1, www.ericsson.com/products/TEMSdrivetesterCDMA200020pos.shtml.

TEMS™ Drive Tester CDMA An Innovative Drive Test Solution, Copyright 2005, pp. 1-4, www.ericsson.com/tems, Publication 287 01-FAP 901 0539 Uen.

"TEMS™ DriveTester" http://www.ericsson.com/services/tems/cdma/drivetester-cdma.shtml 1 Page, Published Jun. 24, 2004.

"TEMS™ DriveTester" http://www.ericsson.com/services/tems/downloads/ds_drivetester.pdf 2 Pages, Published 2002.

* cited by examiner

RAPID EXCHANGE SYSTEM FOR TESTING WIRELESS NETWORKS

CROSS REFERENCE TO RELATED APPLICATIONS

This application claims priority from provisional U.S. Patent Application No. 60/505,822, entitled, "Bracket to Hold Mobile Testing Unit in Vehicle," which was filed Sep. 24, 2003, and which is incorporated herein by reference in its entirety.

BACKGROUND OF INVENTION

Signal network operators frequently use signal testing units to measure and improve signal coverage, such as cellular coverage, in a geographical area. The signal testing units are positioned in the coverage area and collect geographical position data and various radio communication related parameters, such as signal strength. This information is analyzed to troubleshoot and improve the coverage of cellular networks. Currently, signal network operators drive the signal testing units around a geographical area to collect data. Typically, the signal testing unit is placed in a vehicle in an unsecured manner or is semi-permanently mounted to the vehicle. When the signal testing unit is unsecured, it can be easily transferred from one vehicle to another, but the signal testing unit can be easily damaged, stolen, or interfere with operation of the vehicle. If the signal testing unit is semi-permanently mounted to the vehicle, then the unit cannot be easily transferred, and time and special tools may be required to remove and install the unit.

Multiple vehicles may be used to collect data in various locations. One option is to install the signal testing unit in each vehicle, but such an approach can be costly.

Further, when a signal testing unit is transferred to another vehicle, antenna and power connections may be required. The signal testing unit may require connection to a GPS antenna that is external to the testing unit for determining the unit's location as well as cellular antenna(s) for collecting and reporting the data. Additionally, connection to the vehicle's power system may be required. Completing these connections may further complicate transferring a signal testing unit from one vehicle to another if the installation is not compatible with the design of the signal testing unit.

Therefore, there is a need for an apparatus that provides easy removal of a signal testing unit from one vehicle and installation in another, so as to facilitate the use of signal testing units in different vehicles at different times, for monitoring a signal network, such as a cellular network.

BRIEF SUMMARY OF THE INVENTION

The embodiments of mounting devices disclosed below provide for a bracket on which to mount a signal testing unit, and optionally provide for a connector to a power source, GPS antenna, and cellular antennas such that moving a signal testing unit from one vehicle to another can be accomplished more easily. The bracket may provide secure (e.g., preventing unauthorized removal) or non-secure mounting of the signal testing unit. The bracket can be installed in or on a fleet of vehicles to facilitate the movement of the signal testing unit from one vehicle to another by providing the operator with a common bracket and optional electrical connection in one centralized area for secure installation and operation of the unit.

One embodiment of a vehicle mounting assembly includes a bracket that has a front face and a back face. The back face is fastened adjacent a suitable vehicle surface with fasteners, and the front face defines a plurality of keyholes for mounting a signal testing unit. The testing unit includes a plurality of screw-shaped protrusions that are positioned to engage the keyholes of the bracket. To mount the testing unit to the bracket, the head of each protrusion engages the wider, upper portion of a keyhole and the testing unit is moved downwardly until the body of each protrusion is intermediate the narrower, lower portion of a keyhole. The head of the protrusion is positioned behind the lower portion of the keyhole, and because the head is wider than the narrower, lower portion of the keyhole, the removal of the protrusion from the keyhole is prevented.

One embodiment of a mounting system is a U-shaped channel bracket that is defined by three adjacent segments. The signal testing unit is mounted into the U-shaped channel. The bracket is securely mounted to a surface of a vehicle by engaging fasteners into the bracket. The testing unit may be held into position within the bracket by set screws, flanges, or compression springs.

In an alternative embodiment of the invention, the mounting bracket is a box-shaped bracket that is defined by four or more adjacent segments. The bracket is securely mounted to a surface of a vehicle by engaging fasteners into a segment of the bracket. Like the testing unit of the embodiment described above, the testing unit of this embodiment may be held into position within the bracket by set screws, flanges, or compression springs. Additionally, the bracket may include an electrical connector for mating with an electrical connector on the testing unit when the testing unit is positioned within the bracket.

In a further embodiment, the box-shaped bracket includes a door that encloses the testing unit into the bracket. The door may be attached to the bracket by a hinge and swings from an open position to a closed position. Alternatively, the two opposing open edges of the bracket may include channels through which a door may slide adjacent the open edges of the bracket between a closed and an open position.

In another alternative embodiment, the mounting assembly includes a connector plate with two guide pins extending normal to the connector plate. The connector plate is securely mounted adjacent a suitable vehicle surface with fasteners. The testing unit has two sleeves that are each positioned on opposing sides of the testing unit and slidably receive the guide pins on the connector plate. In a further embodiment, the connector plate includes an electrical connector between the two guide pins, and the electrical connector on the plate aligns and mates with an electrical connector on the testing unit when the sleeves of the testing unit are slidably mounted onto the guide pins on the connector plate.

In yet another embodiment, the mounting assembly includes a signal testing unit with a lip extending from each of two opposing sides of the testing unit and a bracket defined by a panel that is intermediate two inwardly opening U-shaped channels. Each U-shaped channel is positioned to slidably receive one of the lips extending from the side of the testing unit. In a further embodiment, the channels also receive a connector plate that has a lip extending from each of two opposing sides of the plate and an electrical connector positioned on the plate to align and mate with an electrical connector on the testing unit. In an alternative embodiment, the connector plate may be integrated into the channels.

DESCRIPTION OF INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Generally the embodiments of mounting devices disclosed below provide for a bracket on which to mount a signal testing unit, and optionally provide for a connector to a power source, GPS antenna, and cellular antennas such that moving a signal testing unit from one vehicle to another can be accomplished more easily. The bracket may provide secure (e.g., preventing unauthorized removal) or non-secure mounting of the signal testing unit. The bracket can be installed in or on a fleet of vehicles to facilitate the movement of the signal testing unit from one vehicle to another by providing the operator with a common bracket and optional electrical connection in one centralized area for secure installation and operation of the unit.

Figures 1, 1A:
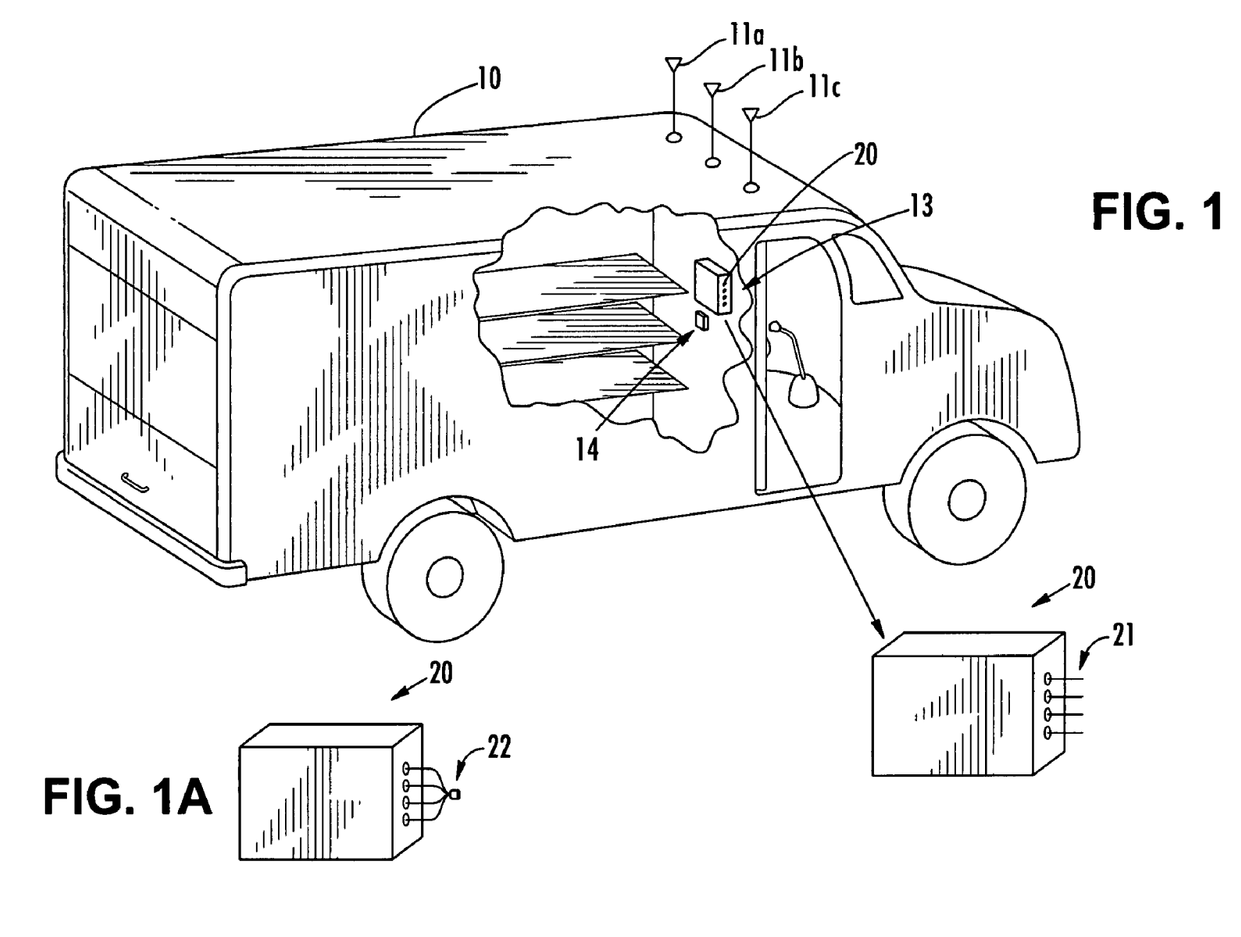
FIG. 1 is a schematic of a vehicle with a signal testing unit mounted to a surface of the vehicle.
FIG. 1A is an illustration of an embodiment of a signal testing unit with one electrical connector.

FIG. 1 depicts an embodiment of the system described above in which the signal testing unit 20 is mounted to a wall 13 inside the vehicle 10. In other embodiments, the testing unit 20 can be mounted against any suitable surface, such as a bulkhead, shelf, roof, floor, or exterior surface of the vehicle, using a bracket. The vehicle 10, which typically is a fleet vehicle, provides connections to a GPS antenna 11a, cellular antennas 11b, 11c, and a power source 14. In the embodiment shown in FIG. 1, the signal testing unit 20 has separate connectors 21 that connect with the power source 14, a GPS antenna 11a, and cellular antennas 11b, 11c. In another embodiment, as shown in FIG. 1A, the signal testing unit 20 includes one connector 22 that provides a connection with the power source 14, the GPS antenna 11a, and the cellular antennas 11b, 11c. In alternative embodiments, one or more of the antennas may be internal to the signal testing unit 20 and no connection to an external antenna 11a-c is required. Furthermore, the signal testing unit 20 may contain an internal energy source and not require connection to an external power source 14.

Figures 2, 2A:
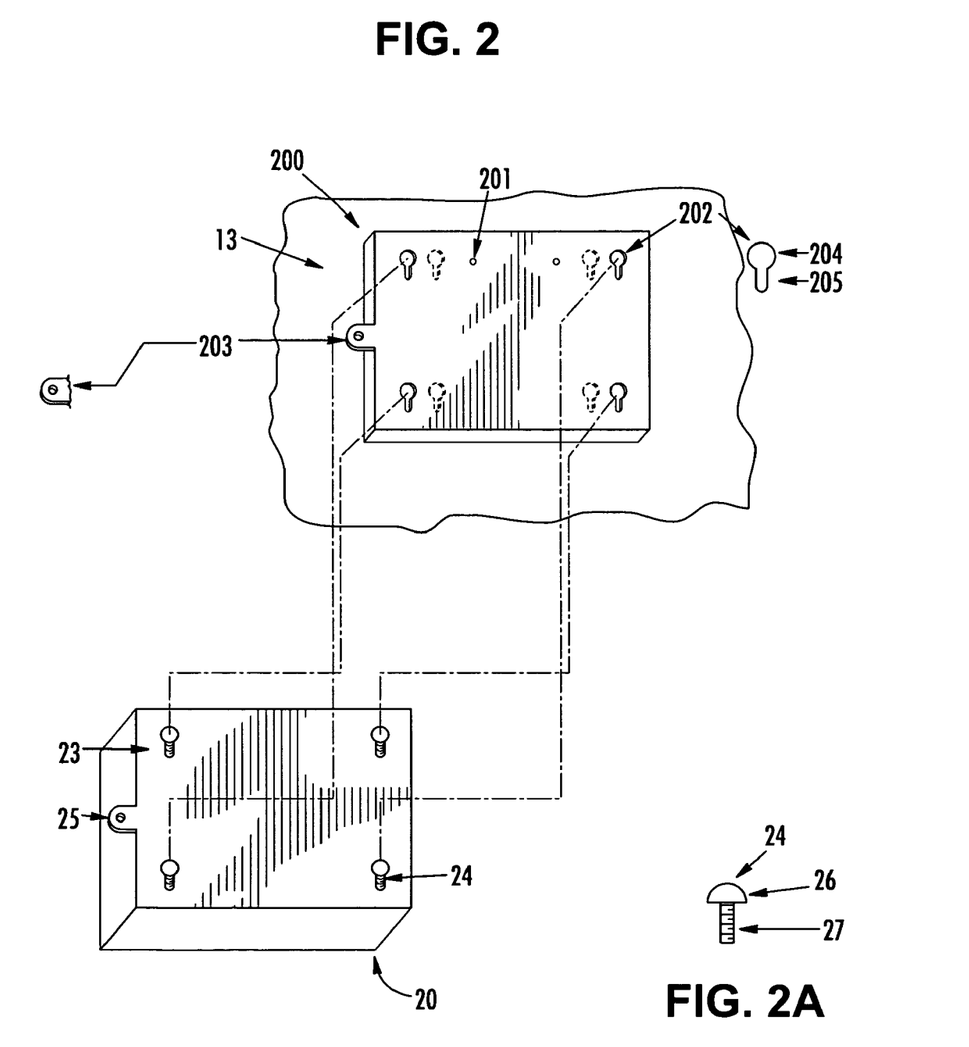
FIGS. 2-10 illustrate mounting assemblies and systems according to different embodiments of the invention.

FIG. 2 depicts an embodiment of a mounting bracket 200. The mounting bracket 200 is in the form of a plate that defines a plurality of apertures 201 for receiving a fastener, such as a bolt or screw. A bolt or screw is engaged through each aperture 201 and into the vehicle surface 13 to hold the bracket 200 in a substantially stable position relative to the vehicle surface 13. Alternative embodiments of the mounting bracket 200 may utilize fasteners such as pins, straps, clamps, adhesives, welds, or other suitable fasteners known in the art that can be used to secure the bracket 200 to the vehicle surface 13.

The mounting bracket 200 further defines a plurality of keyholes 202. Each keyhole 202 comprises a top portion 204 and a bottom portion 205 where the breadth of the top portion 204 is larger than the bottom portion 205. In the embodiment shown in FIG. 2, the keyholes 202 are arranged along the outer perimeter of the front face of the mounting bracket 200. Alternative arrangements may include, for example, keyholes 202 positioned down a column in the center of the plate or in a row across the top of the plate.

In FIG. 2, a plurality of protrusions 24 on the signal testing unit 20 are screws or bolts that extend normal to the rear face 23 of the testing unit 20 and are positioned to match up with the keyholes 202 located on the mounting bracket 200. As shown in FIG. 2A, the screws 24 have an upper portion, or head, 26 and a lower portion, or body, 27, and the head 26 is of greater breadth than the body 27.

In an alternative embodiment, the signal testing unit 20 includes a lock-receiving portion 25 for receiving a locking mechanism, such as a padlock, locking cylinder, or other suitable locking mechanism known in the art. The bracket 200 further includes a lock-receiving portion 203 that aligns with the lock-receiving portion 25 of the testing unit 20. In the embodiment of the mounting assembly shown in FIG. 2, the lock-receiving portions 25, 203 are tabs that have an aperture in the center of each tab. When the testing unit 20 is mounted onto the bracket 200, the tab 25 of the testing unit 20 and the tab 203 of the bracket 200 are aligned so that the apertures are coincident and allow insertion of a padlock. Alternative locking mechanisms may be used, such as a tab padlock, eye/hasp, locking cylinder, or other suitable locking mechanism known in the art.

To assemble the mounting assembly according to one embodiment, the mounting bracket 200 is attached to a vehicle wall 13 by engaging screws or bolts through the apertures 201 and into the surface of the vehicle wall 13. The signal testing unit 20 is mounted to the mounting bracket 200 by placing the head 26 of each screw 24 through the top portion 204 of each keyhole 202 and then moving the testing unit 20 downwardly until the body 27 of the screw 24 is within the bottom portion 205 of the keyhole 202 and the head of the screw 24 is behind the bottom portion 205. After the testing unit 20 is mounted onto the bracket 200, the tab 203 of the mounting bracket 200 and the tab 25 of the testing unit 20 are aligned, and a padlock or locking cylinder is engaged through the tabs to prevent unauthorized removal of the testing unit 20 from the bracket 200.

It may be desirable to mount different sized testing units to the mounting bracket. The location of the protrusions on the rear face of a testing unit may differ depending on the testing unit's size. For example, if protrusions on testing units are positioned in a similar pattern, the protrusions on the smaller units will be closer together than the protrusions on the larger units. To accommodate testing units of different sizes, an alternative embodiment of the mounting bracket 200 described above includes a plurality of spaced apart keyholes (see dashed lines of FIG. 2) located in a plurality of columns across the face of the bracket 200.

As an alternative embodiment to the plate embodiments described above, a U-shaped channel member 300 is formed into a U-shaped cross-sectional mounting bracket. In the embodiment illustrated in FIG. 3, the front surface 305 of the U-shaped member 300 defines a plurality of keyholes 202, an access hole 306 for accessing a fastener receiving portion 301, and a lock-receiving portion 303 for receiving a locking mechanism, such as those locking mechanisms discussed above in connection with FIG. 2.

Figure 3:
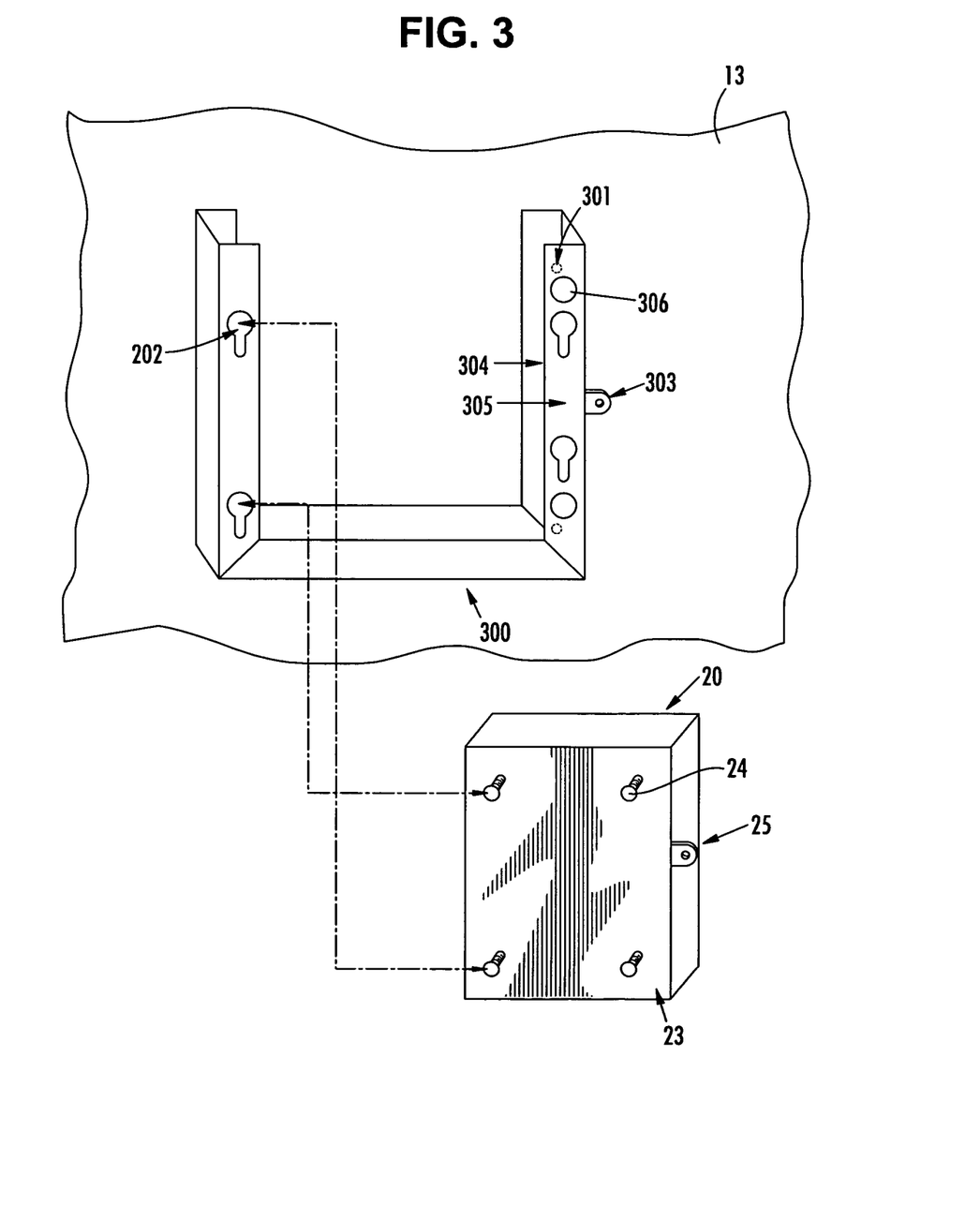

The rear surface of the U-shaped channel member 300 is mounted adjacent to a suitable vehicle surface 13, such as a wall, by fasteners utilizing the fastener receiving portion 301.

As discussed above regarding FIG. 2, fasteners may include a screw, bolt, pin, strap, clamp, adhesive, weld, or other fastener known in the art.

The testing unit 20 described above in relation to FIG. 2 can be mounted to the embodiment of the mounting bracket 300 described in relation to FIG. 3. The heads 26 of each screw 24 are engaged through the top portion 204 of a corresponding keyhole 202, and the testing unit 20 is moved downwardly until the body 27 of each screw 24 is adjacent the bottom portion 205 of each keyhole 202. Alternatively, it should be appreciated by those skilled in the art that hooks and an eye for receiving hooks can be used to mount the signal testing unit 20 in lieu of protrusions and keyholes, respectively. Other embodiments can use hook and loop fasteners, such as the hook and loop fasteners sold under the trademark VELCRO.

The lock-receiving portion 303 of the mounting bracket 300 shown in FIG. 3, like the lock-receiving portion 203 shown in FIG. 2, is a tab that defines an aperture in the center of the tab. When the testing unit 20 is positioned onto the mounting bracket 300, the tabs 303, 25 are aligned and can receive a locking mechanism, such as padlock or locking cylinder, to prevent unauthorized removal of the testing unit 20 from the bracket 300.

Figure 4:
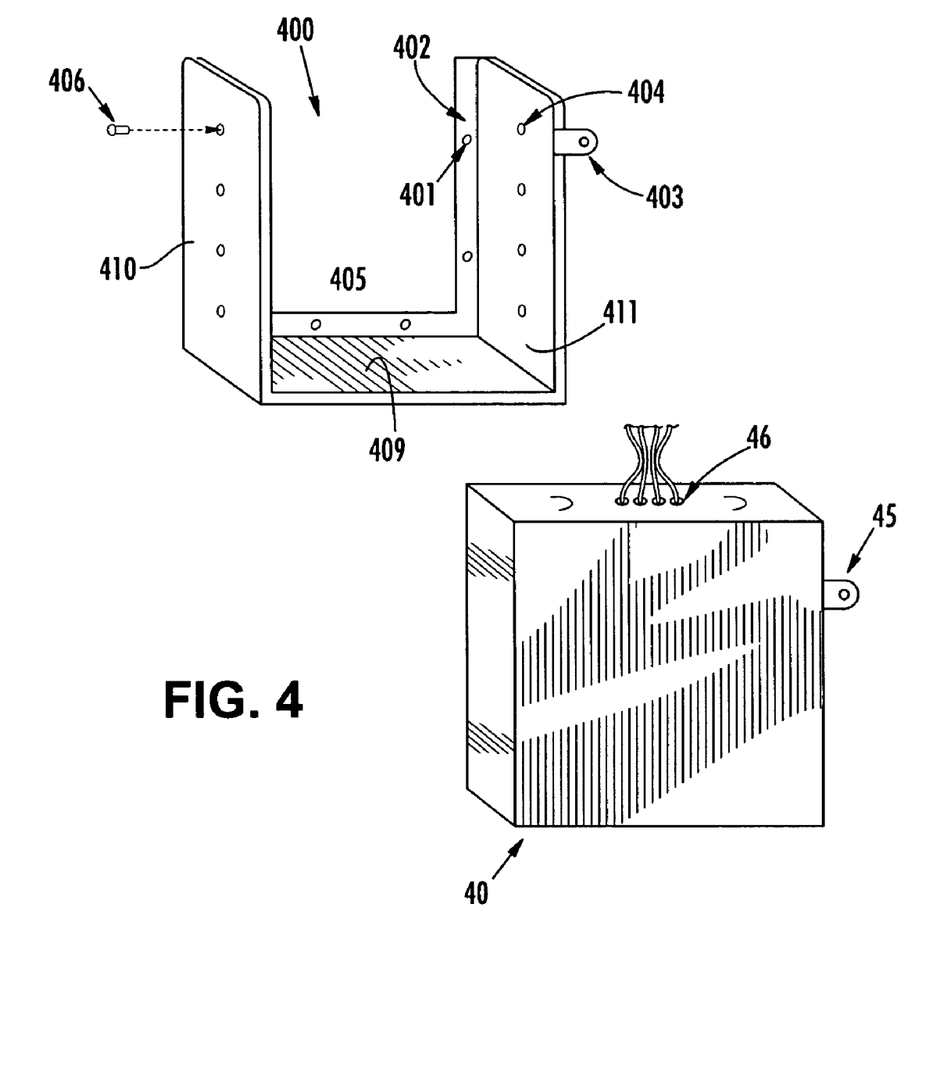

In the embodiment shown in FIG. 4, a mounting bracket 400 defines a U-shaped holder 405 into which a user may place the signal testing unit 40. Three segments, including a center segment 409 and two side segments 410, 411, are connected to define the U-shaped holder 405. Side segment 411 includes a lock-receiving portion 403 for receiving a locking mechanism, such as those discussed in relation to FIGS. 2 and 3, to prevent unauthorized removal of the testing unit 40 from the holder 405.

In one embodiment, a vehicle-mounting flange 402 extends inwardly from each side segment 410, 411 towards the opposing side segment and includes a fastener receiving portion 401 for receiving a fastener to mount the holder 405 to a suitable vehicle surface 13. Any of the fasteners discussed in connection with the mounting brackets shown in FIGS. 2 and 3 can be used.

In the embodiment shown in FIG. 4, the signal testing unit 40 is secured in a stable position relative to the holder 405 by engaging a plurality of set screws 406 through a plurality of spaced apart threaded apertures 404 positioned along the two side segments 410, 411 of the holder 405 until the set screws 406 contact the side of the testing unit 40. FIG. 4 shows the apertures 404 positioned in a column down the center of each side segment 410, 411, but alternative positioning would be sufficient as long as the set screws 406 were able to contact the testing unit 40 and prevent its movement relative to the holder 405.

Figure 4A:
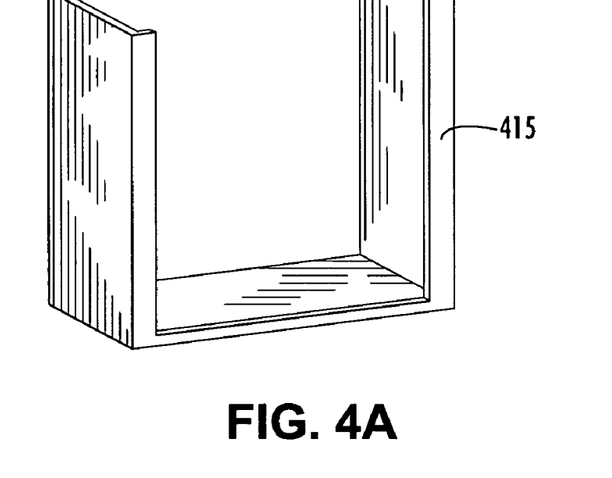

In one embodiment shown in FIG. 4A, a U-shaped flange 415 is connected to the side segments 410, 411 and the center segment 409 and extends inwardly from and normal to the segments. The flange 415 extends sufficiently inwardly to prevent the movement of the testing unit 40 relative to the holder 405 in a direction normal to the flange 415.

Figure 4B:
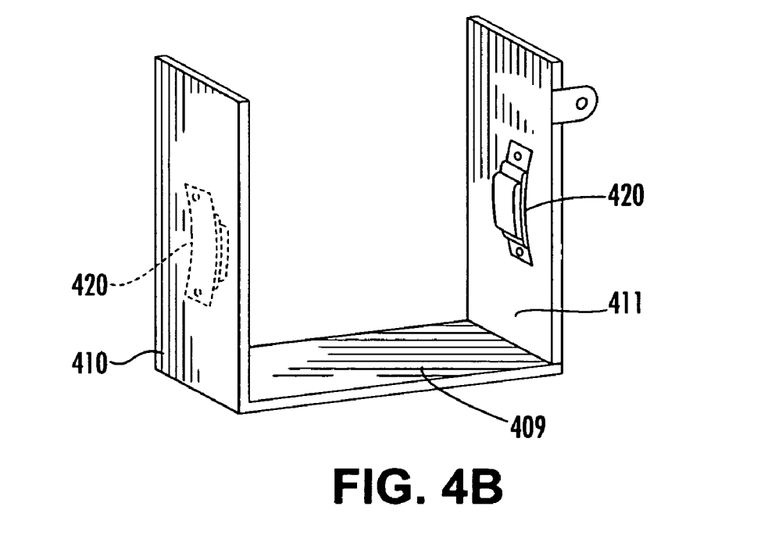

In an alternative embodiment, as shown in FIG. 4B, the signal testing unit 40 is secured in a stable position relative to the holder 405 by engaging compression springs 420. The compression springs 420 are positioned on each of the inwardly facing surfaces of the side segments 410, 411. When the testing unit 40 is inserted into the holder 405, the springs 420 are engaged and urged into pressurized contact with the testing unit 40, which prevents the testing unit 40 from any substantial movement relative to the holder 405.

Figure 4C:
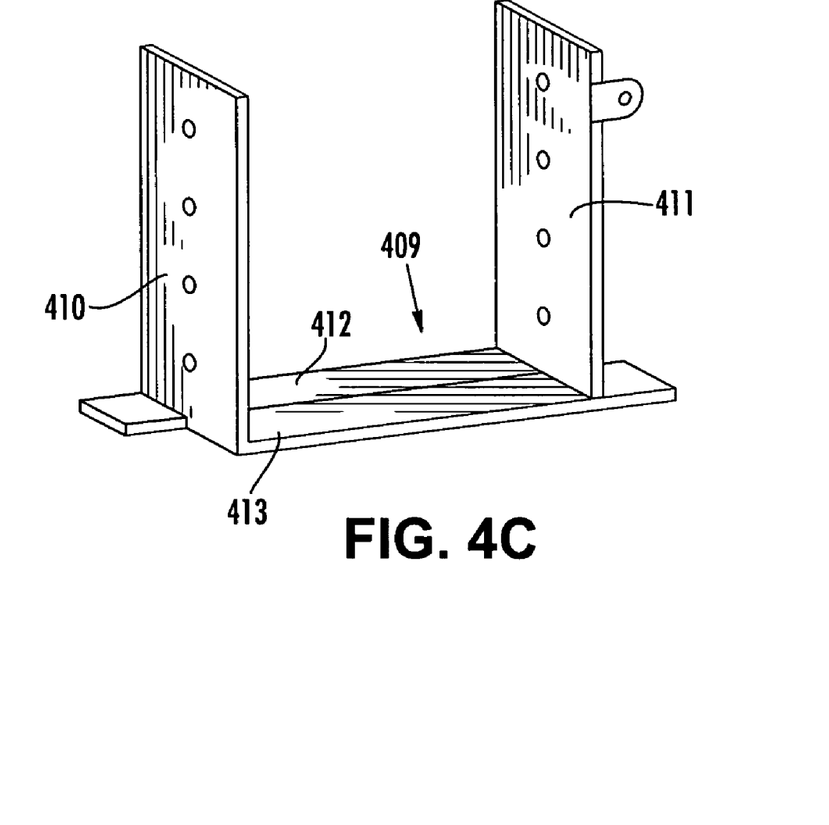
Figure 4D:
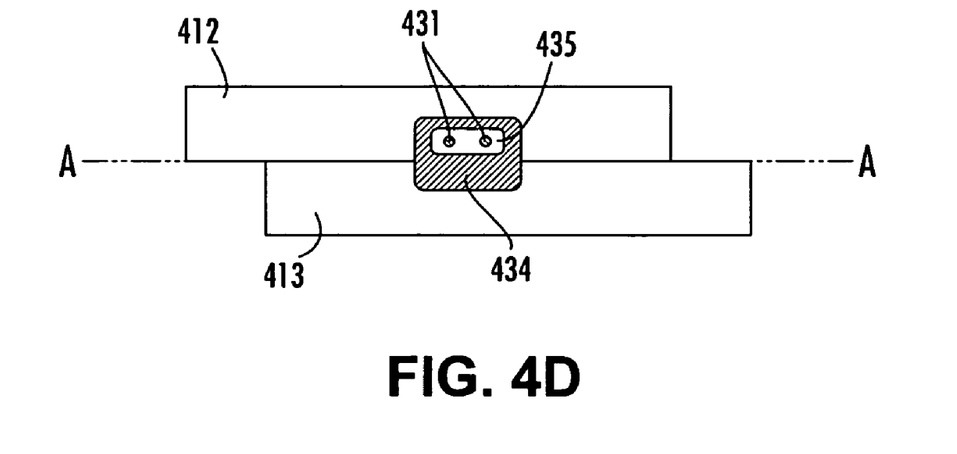

The use of set screws, flanges, or compression springs allows for some flexibility in mounting testing units of various sizes. However, if a unit significantly differs in size from other units, it may be desirable to adjust the width between the side segments 410, 411 of the U-shaped holder 405 to accommodate the testing units 40. In the embodiment shown in FIG. 4C, the center segment 409 includes a first panel 412 that is connected to side segment 411 and a second panel 413 that is connected to side segment 410, and the first 412 and second panels 413 are slidably connected with each other. As shown in FIG. 4D, the bottom face of the first panel 412 includes two screws 431 that extend normal to the bottom face and are positioned to form a line that is parallel to the axis A-A along which the two panels 412, 413 slide relative to one another. A slotted bracket 434 is attached to the second panel 413, and the screws 431 attached to the bottom of the first panel 412 are positioned within the slot 435 of the slotted bracket 434. The positioning of the screws 431 in the slot 435 maintains the horizontal positional relationship of the first panel 412 and the second panel 413 and prevents the panels 412, 413 from moving relative to each other at an angle from their common axis A-A.

When the first panel 412 slides relative to the second panel 413, side segment 410 is moved relative to side segment 411. For example, if the first panel 412 is moved in one direction relative to the second panel 413, the side segment 411 moves closer to side segment 410. Conversely, if the first panel 412 is moved in the other direction relative to the second panel 413, side segment 411 moves away from side segment 410.

FIGS. 2-4D illustrate mounting brackets that do not incorporate an electrical connector. When mounting brackets do not incorporate electrical connectors, the operator may have to connect the signal testing unit's connector(s) to an external antenna(s) and/or power source(s) after the signal testing unit is installed or mounted to the bracket. Thus, an embodiment of each of the testing units described above in relation to FIGS. 2-4D typically would have one or more connectors for connection with an external antenna(s) and/or power source(s), if required.

Figure 5:
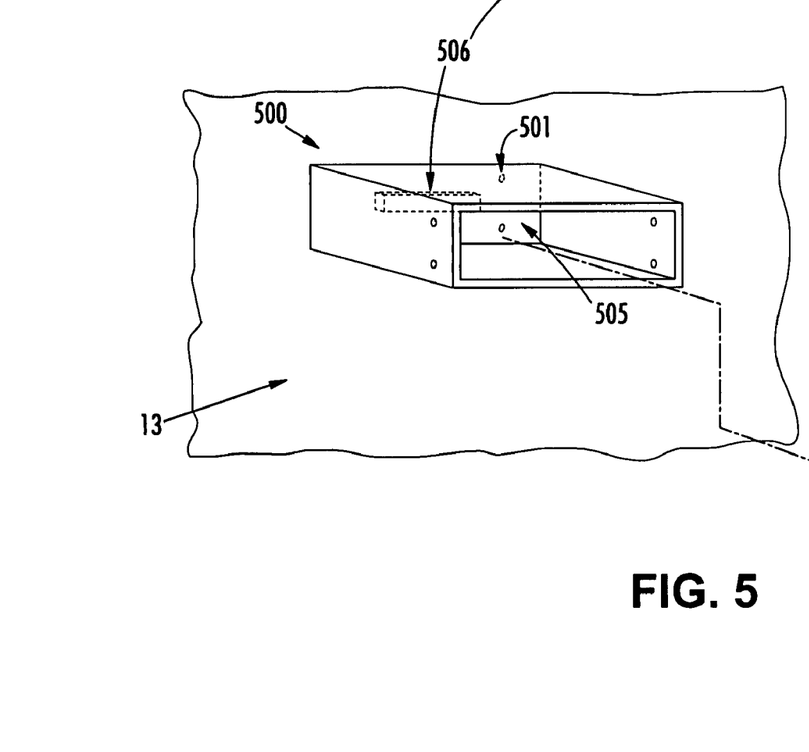

FIG. 5 shows an open box-shaped mounting bracket 500 mounted to a suitable vehicle surface 13 and dimensioned to receive a signal testing unit 50. In this embodiment, the box-shaped mounting bracket 500 includes at least one fastener receiving portion 501 on each of the five faces of the bracket 500, and the fastener receiving portions 501 are positioned so that any face is capable of being mounted to the vehicle surface 13. The mounting bracket 500 is mounted to the vehicle surface 13 by engaging a fastener, such as those discussed in FIGS. 2 and 3, into the fastener receiving portion 501 on one of the faces of the bracket 500. Alternatively, a flange attached to the external portion of the bracket (not shown) could be used for receiving a fastener.

In one embodiment, an electrical connector 506, typically providing power, GPS signal, or cellular signals, is positioned on the interior back face 505 of the bracket 500. When the testing unit 50 is properly positioned within the mounting bracket 500, the connector 506 aligns with a mating connector 51 that is positioned on the back surface of the signal testing unit 50. Normally, a user will slide the testing unit 50 into the mounting bracket 500 until the connectors 506, 51 engage.

Figure 5A:
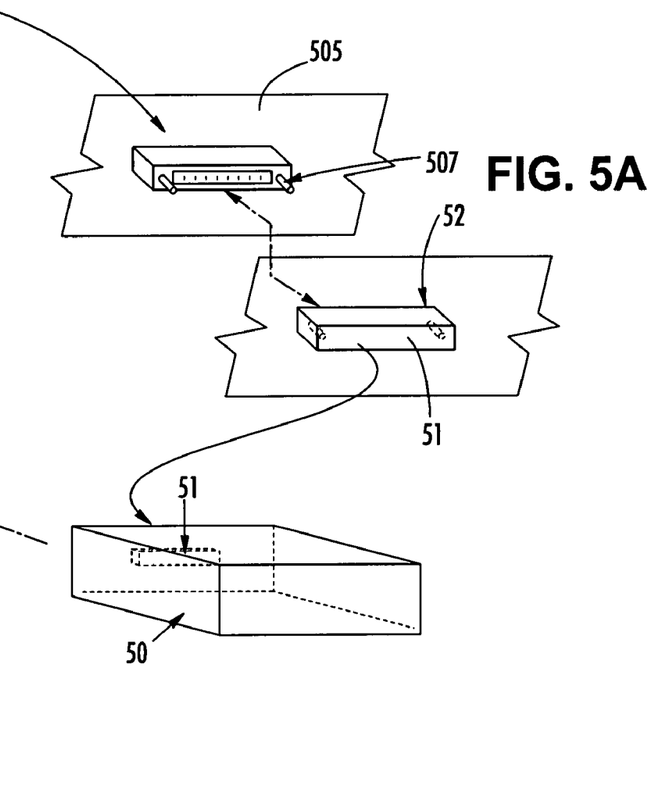

In an alternative embodiment, the connector 506 on the interior back face 505 further includes a guiding device, such as guide pins or channels, for urging the connector 506 on the bracket 500 into mating alignment with the connector 51 on the testing unit 50. In the embodiment shown in FIG. 5A, guide pins 507 are positioned on either side of the connector 506, and the connector 51 on the signal testing unit 50 includes bores 52 for receiving each pin 507. The relative positions of the pins 507 and bores 52 facilitate the alignment and proper engagement of the connector 506 on the bracket 500 with the connector 51 on the signal testing unit 50 when the signal testing unit 50 is being placed into the mounting bracket 500. Other guiding devices may be substituted for the pins 507 and bores 52 shown.

The connector 506 on the mounting bracket 500 is connected with the power source 14, GPS antenna 11a, and cellular antennas 11b, 11c that are connected to the vehicle 10, as discussed in connection with FIG. 1. In other embodiments, two or more connectors may be used to provide connections to such devices individually, or in different combinations. Additionally, the external GPS antenna and external cellular antennas may be positioned inside or outside of the vehicle.

Figure 6:
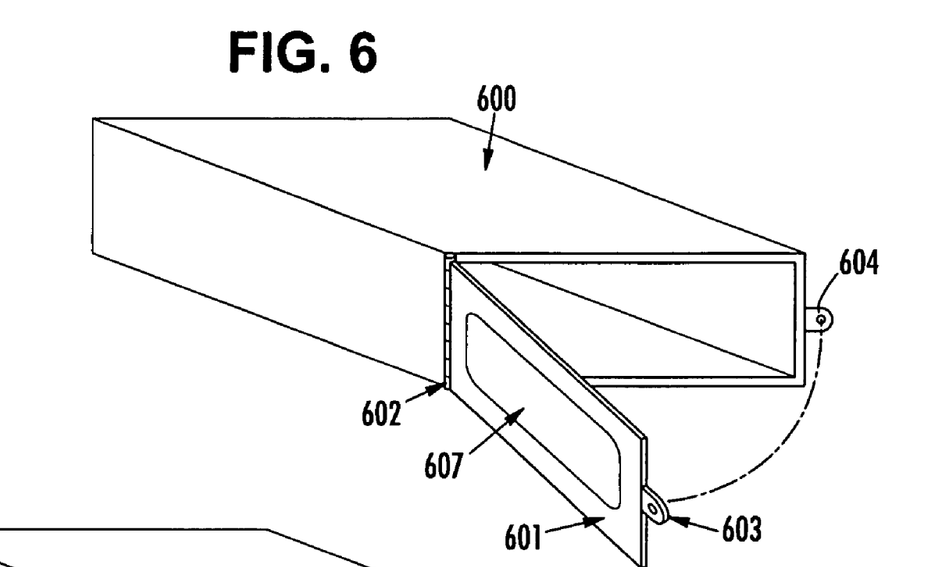

FIG. 6 is an alternative box-shaped mounting bracket 600 in which the box-shaped mounting bracket 600 has a door 601 dimensioned to enclose the box opening 610 and prevent the signal testing unit 50 from entering or exiting the mounting bracket 600 while the door 601 is in a closed position. In one embodiment, the door 601 is connected to an edge of the bracket opening 610, either along a side edge or along the top or bottom edge, by a hinge 602, for movement between a closed position and an open position. The door 601 occupies a closed position when the door 601 is positioned so that the signal testing unit 50 may not enter or exit the mounting bracket 600. The door 601 occupies an open position when the door 601 is positioned so that the signal testing unit 50 may enter or exit the mounting bracket 600.

The door 601 further includes a lock-receiving tab 603 on the door edge opposite the hinge such that when the door 601 occupies a closed position, a locking mechanism may be engaged into the lock-receiving tab 603 and a corresponding tab 604 positioned on an edge of the box opening, to prevent the unauthorized removal of the signal testing unit 50. In place of the tabs 603, 604, appropriate locking mechanisms include hasp and eye hooks, cylindrical locks, and latches.

In one embodiment, the door 601 has an access opening 607 such that when the door 601 is in a closed position, the connector(s) 51 on the signal testing unit 50 are available for connection through the access opening 607, which is too small for removal of the testing unit 50. Alternatively, the access portion 607 may be on the side or other portion of the mounting bracket 600 depending on the position of connectors on the testing unit 50, such that the connectors 51 on the signal testing unit 50 are available after insertion of the testing unit 50 into the mounting bracket 600.

Figure 6A:
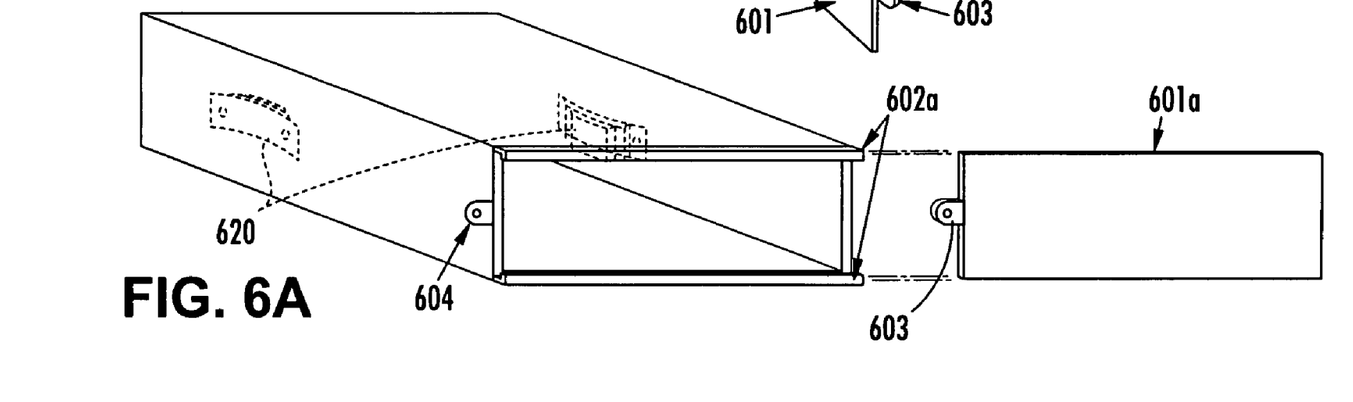

In FIG. 6A an alternative closure in the form of a slidable door 601a is shown. The open edges of the box-shaped mounting bracket 600 provide a pair of opposing channels 602a through which the door 601a may slide adjacent the open edges of the mounting bracket 600 between a closed and open position, for the purposes described in connection with the embodiment discussed above.

Figures 7, 7A:
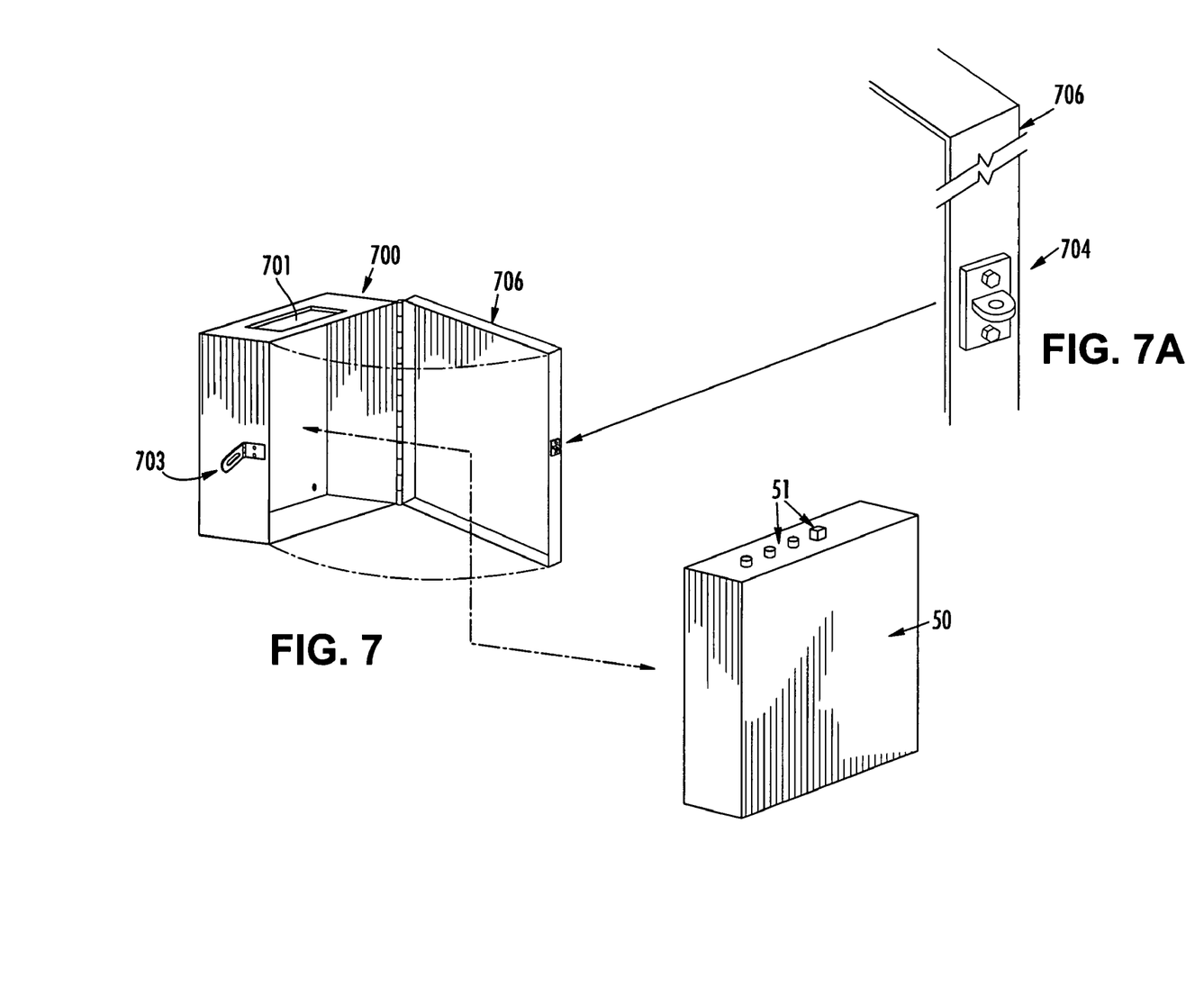

FIG. 7 shows an alternative embodiment to the box-shaped mounting brackets depicted in FIGS. 5 and 6, in which a box-shaped mounting bracket 700 again is enclosed by a movable door 706 that swings on a hinge. The mounting bracket 700 fastens to a suitable vehicle surface (not shown) similar to the box-shaped mounting bracket 500, 600 discussed with FIGS. 5 and 6. One side of the box-shaped mounting bracket 700 defines an access opening 701 that is positioned to align with the connectors 51 on the signal testing unit 50. The access opening 701 is dimensioned large enough to allow the connectors 51 on the signal testing unit 50 to extend through the access portion 701 while preventing the remainder of the signal testing unit 50 from extending through the access portion 701.

The mounting bracket further includes a conventional host 703 and a mating eye 704 to secure the door 706 into a closed position. In one embodiment, as shown in FIG. 7A, the eye 704 is positioned on the side of the door 706 opposite the hinge, and the host 703 is positioned on the side of the bracket 700 to align with the eye 704 when the door 706 is in a closed position. When the door 706 is in a closed position, the host 703 is placed over the eye 704 and a lock is attached to the eye 704 to secure the door 706, thus preventing removal of the signal testing unit 50. When the embodiment in FIG. 7 is utilized, the connectors 51 of the signal testing unit 50 may be connected to a power source 14, GPS antenna 11a, or cellular antennas 11b, 11c through a grouping of connectors positioned near the mounting bracket 500.

The box-shaped mounting bracket embodiments described above in relation to FIGS. 5-7 may further include compression springs, such as the springs 620 shown in FIG. 6A. The springs 620 are attached to at least two opposing, inwardly facing surfaces of a box-shaped bracket 600. The compression springs 620 may be like those described in relation to FIG. 4, positioned to engage the testing unit when it is inserted into the bracket and prevent its movement relative to the bracket.

Figures 8, 8A:
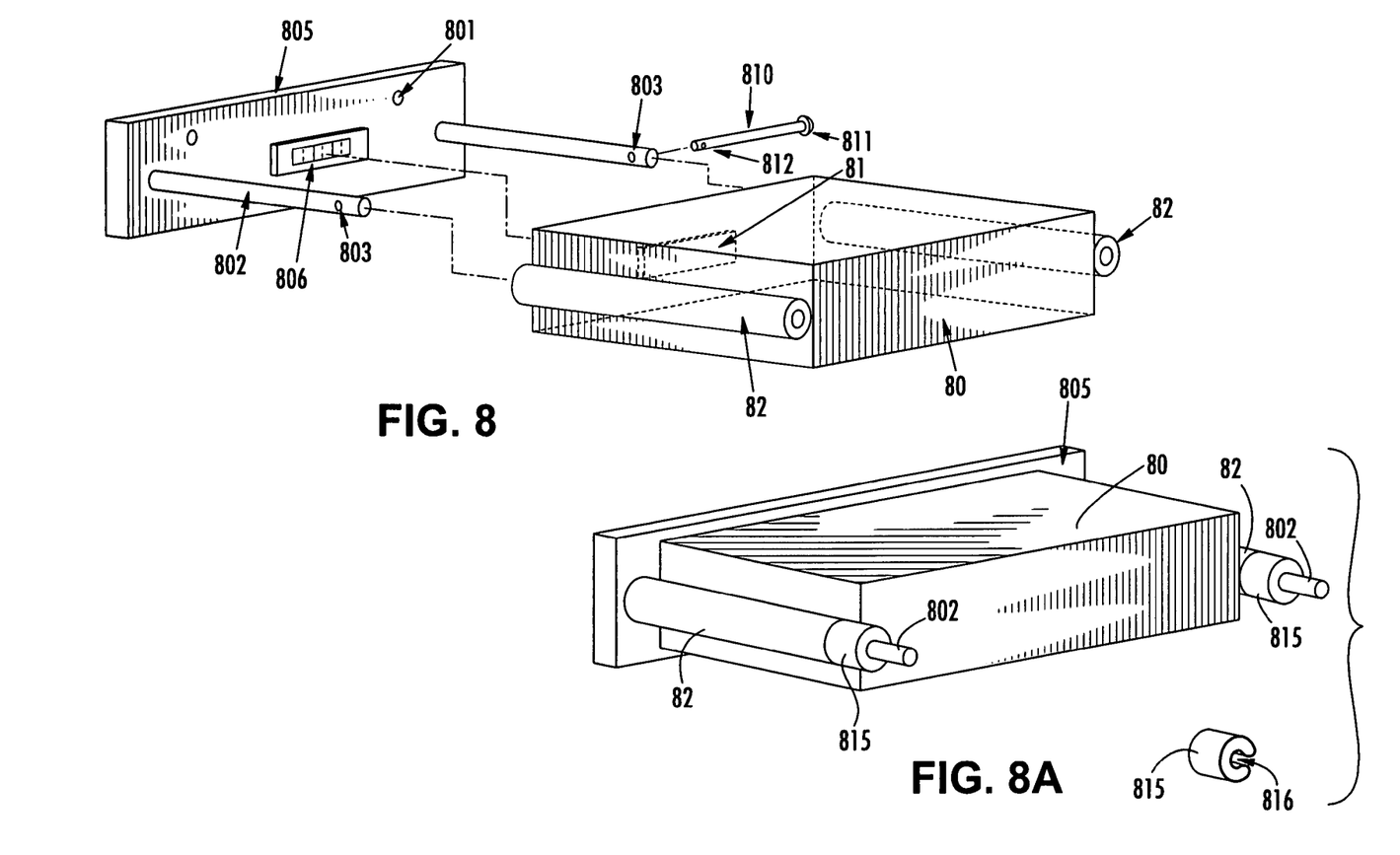

In an alternative embodiment of a mounting assembly 800 shown in FIG. 8, the mounting bracket is a connector plate 805 that includes two guide pins 802 that extend perpendicularly from the front face of the plate 805 and an electrical connector 806 centered between the two guide pins 802. The connector plate 805 also includes a plurality of fastener receiving portions 801. The connector plate is attached to a suitable vehicle surface 13 by engaging a fastener into each fastener receiving portion 801, as discussed with FIGS. 2 and 3.

A hollow, cylindrical sleeve 82 is positioned horizontally along and attached to each of two opposite side faces of the signal testing unit 80. The sleeves 82 each slidably receive a guide pin 802. An electrical connector 81 is centered on the rear face of the testing unit 80. Eye brackets or square-shaped sleeves, for example, may be used as guide pin receivers in alternative embodiments.

The signal testing unit 80 is assembled onto the mounting assembly 800 by aligning the sleeves 82 with the guide pins 802 and sliding the signal testing unit 80 towards the connector plate 805 so that the electrical connector 81 on the signal testing unit 80 faces and mates with the connector 806 on the connector plate 805.

Additionally, each guide pin 802 has an opening 803 at the end of the guide pin 802 farthest from the connector plate 805. In one embodiment, a lock is inserted into one of the openings 803 to prevent the removal or mounting of the sleeves 82 attached to the testing unit 80. In an alternative embodiment, as shown in FIG. 8, the mounting assembly further includes a T-shaped bar 810 with a head end 811 and a lock-receiving end 812. When the lock-receiving end 812 has passed through both openings 803 of guide pins 802, an aperture on the lock-receiving end 812 is positioned outside of the space intermediate the two guide pins 802. A padlock, locking cylinder, or other suitable locking mechanism is engaged into the aperture on the lock-receiving end 812 to prevent the removal of the T-shaped bar 810 from the mounting assembly's guide pins 802 and prevent the removal or mounting of the sleeves 82 attached to the testing unit 80.

In an alternative embodiment, such as the embodiment shown in FIG. 8A, stops 815 are used to prevent the movement of the testing unit 80 relative to the connector plate 805.

The stops 815 of the embodiment shown in FIG. 8A are made of rubber or other flexible material and include an opening 816 for receiving one or more guide pins 802. The stops 815 slide onto each guide pin 802 after the testing unit 80 is mounted to the mounting assembly and are positioned adjacent the sleeves 82. The stops 815 prevent the sleeves 82 from sliding relative to the guide pins 802.

In another alternative embodiment, the guide pin receivers are positioned differently to accommodate the mounting of different sized testing units on the same mounting assembly 800. For example, in one embodiment, if a first testing unit is smaller than a second testing unit, the guide pin receivers attached to the first testing unit are positioned farther away from the sides of the first testing unit to enable them to engage the guide pins 802 on the connector plate 805. Alternatively, the connector plate 805 may include guide pins 802 that can be moved to alternate positions on the plate 805 to accommodate testing units of differing sizes (not shown).

In yet another alternative embodiment, which is similar to the adjustable bracket embodiment described in relation to FIGS. 4C and 4D, the connector plate 805 is defined by two adjacent sections that are in slidable contact with each other, and each adjacent section includes at least one guide pin 802. The two adjacent sections of the connector plate 805 are moved relative to each other to align the guide pins 802 with the guide pins receivers adjacent the signal testing unit 80.

Figure 9:
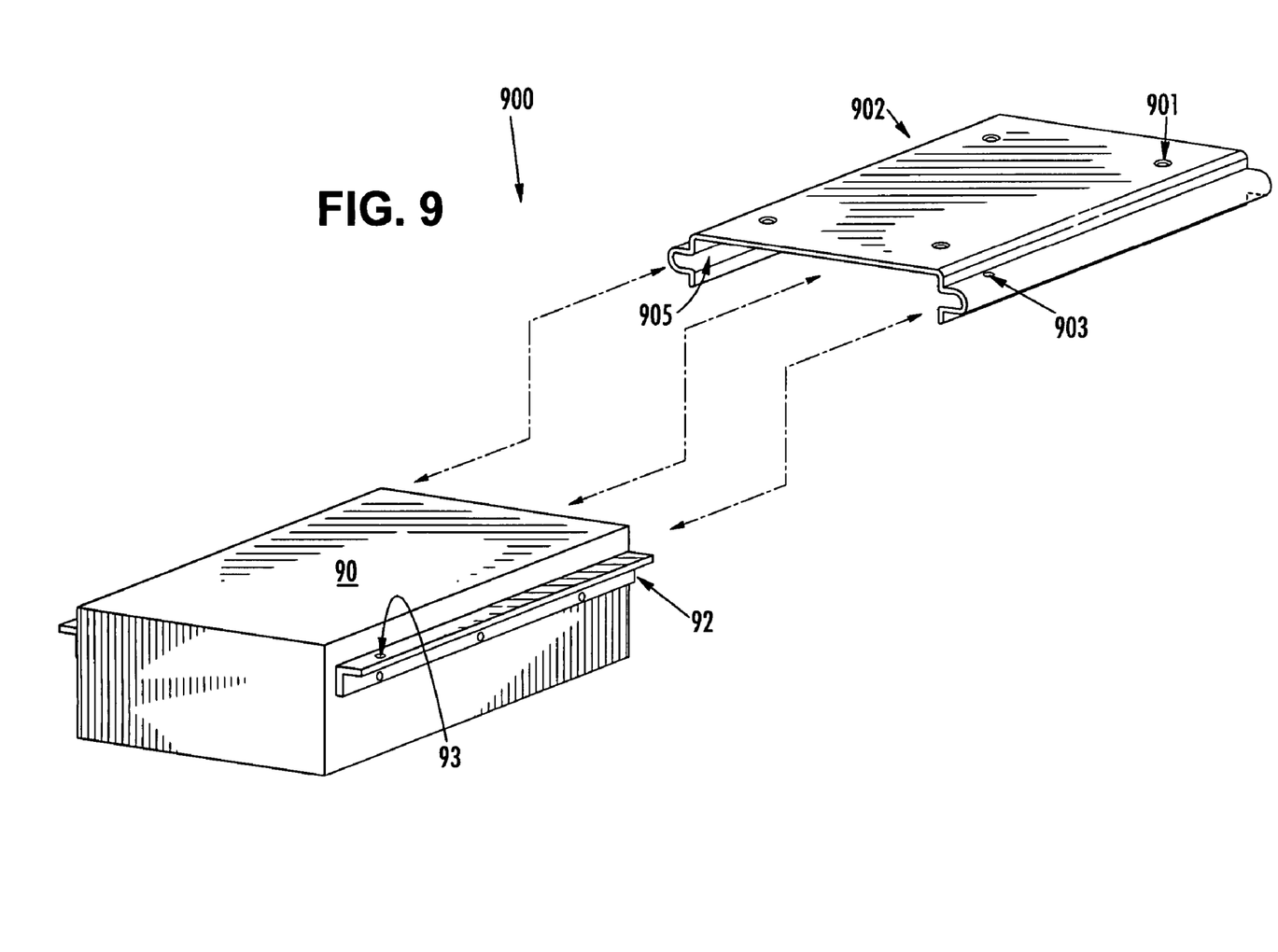

FIG. 9 shows an alternative embodiment of a mounting assembly 900 that includes a signal testing unit 90 with a lip 92 attached to, or formed onto, each of two opposing side faces of the signal testing unit 90. The mounting bracket 902 has a panel intermediate two inwardly opening U-shaped channels 905. The channels 905 are positioned each to slidably receive one of the lips 92 of the testing unit 90. The panel includes a fastener receiving portion 901, and is attached to a suitable vehicle surface 13 by engaging a fastener into each fastener receiving portion 901, as discussed with FIGS. 2 and 3. The mounting bracket 902 may be mounted, for example, under a shelf, in the orientation as shown, or it may be mounted, for example, on top of a shelf or other surface. Further, the bracket 902 may be mounted in a vertical orientation with sliding movement of the signal testing unit 90 in a side-to-side or up-and-down direction.

One of the lips 92 on the signal testing unit 90 defines an opening 93 that receives a locking mechanism. The U-shaped channel 905 that receives the lip with the opening 93 defines an opening 903 that receives a locking mechanism. The lips 92 of the signal testing unit 90 are slidably engaged into the channels 905 of the mounting bracket 902 until the opening 93 of the signal testing unit 90 is aligned with the opening 903 of the channel 905. A locking mechanism is then engaged into the openings 93, 903 to prevent unauthorized removal of the signal testing unit 90. Other lock-providing mechanisms can be substituted for the openings 93 and 903.

Figure 10:
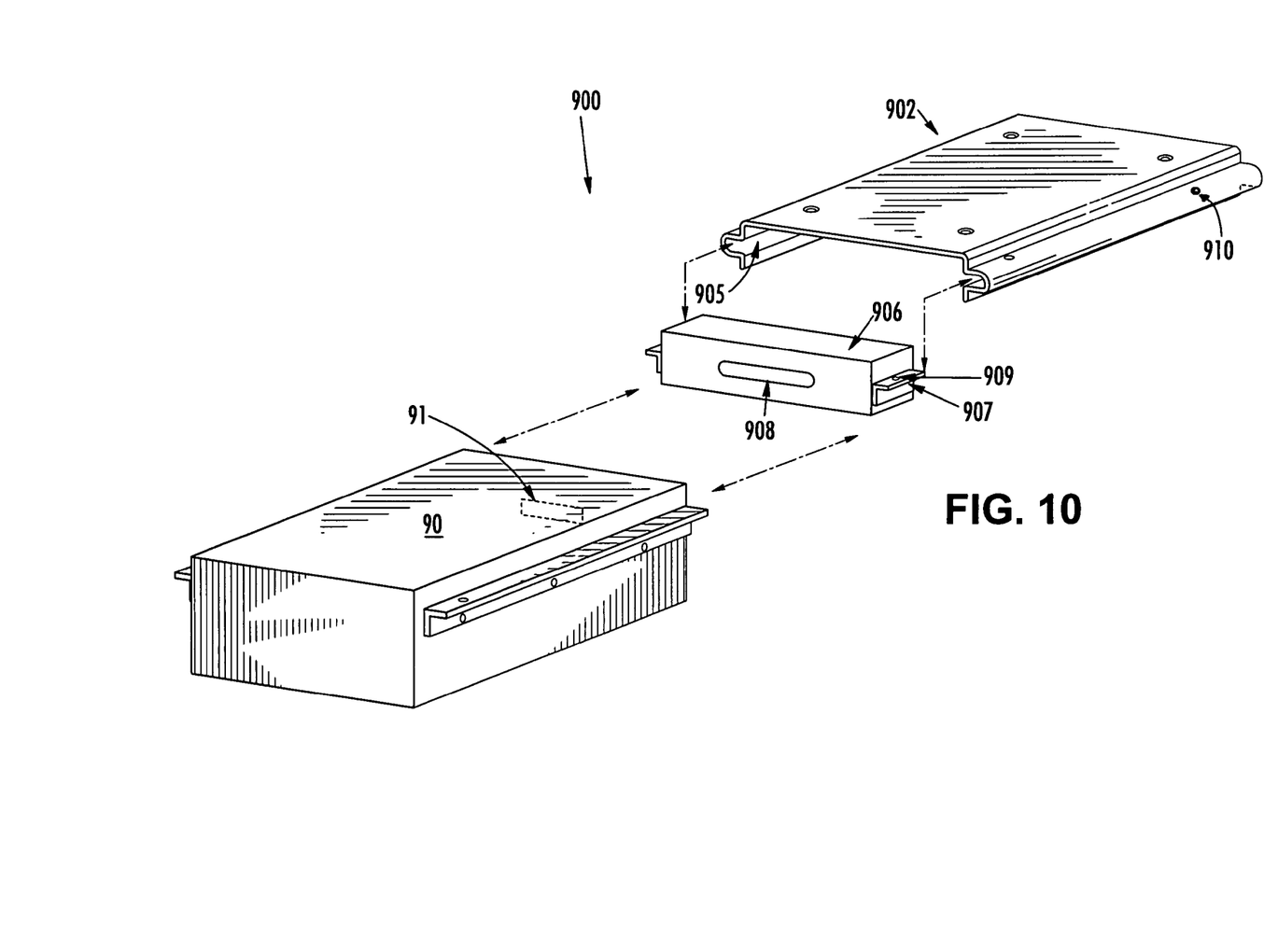

FIG. 10 depicts an alternative embodiment of the mounting assembly 900 in which the mounting assembly 900 further comprises a modular electrical connector plate 906 with lips 907 positioned along two opposing side faces of the connector plate 906. The lips 907 are positioned such that they will be received into the channel 905 of the mounting bracket 902. An electrical connector 908 is positioned on the face of the connector plate 906 so that when the plate 906 and the testing unit 90 are mounted within the channel 905, the electrical connector 908 on the connector plate 906 is adjacent and mates with the connector 91 on the signal testing unit 90.

The lips 907 on the connector plate 906 have an opening 909, and the channels 905 on the mounting bracket 902 have an opening 910 that is positioned to align with the opening 909 of the lip 907. A fastener is engaged into the openings 909, 910 to prevent movement of the connector plate 906 relative to the mounting bracket 902. As discussed previously, suitable fasteners include bolts, pins, straps, hook, and any other suitable fasteners known in the art. Alternative embodiments of fastening the connector plate 906 to the bracket 902 include using adhesives, hook/eye closures, and other fasteners known in the art. Although not shown, the connector plate 906 may be formed integrated with the mounting bracket 902.

In all of the embodiments described above, those skilled in the art may choose an appropriate material for the described parts of the mounting brackets and signal testing units. Such materials may include plastics, metals, or other suitable materials. Similarly, the connectors shown may be selected to mate with power sources, antenna, etc., that are being used in the vehicle with the signal testing unit.

That which is claimed:

1. A signal testing assembly mounted to a vehicle surface, said assembly comprising:
   a signal testing unit having a plurality of guide pin receivers positioned along at least two opposing exterior surfaces of said testing unit;
   a connector plate comprising a front planar face, a back planar face, at least one fastening portion for securely mounting said back planar face adjacent a surface of said vehicle, a plurality of guide pins extending from said front planar face, and at least one electrical connector for engaging a mating electrical connector on said signal testing unit;
   wherein said guide pin receivers slidably engage said guide pins, said back planar face of said connector plate is mounted adjacent said vehicle surface, and said signal testing unit is mounted adjacent said front planar face of said connector plate such that said connector plate is disposed between said signal testing unit and said vehicle surface;
   wherein each of said guide pins includes a top portion and a bottom portion; and
   at least two of said guide pins include an aperture in said top portion of each guide pin, said apertures being aligned to receive a T-shaped bar.

2. The assembly of claim 1, wherein at least one of said guide pins includes a locking mechanism for preventing removal of said testing unit after said guide pin receivers are slidably engaged with said guide pins.

3. The assembly of claim 2, wherein said locking mechanism includes an aperture and a lock, said aperture being configured for receiving said lock.

4. The vehicle-mounted assembly of claim 1 further comprising:
   one or more stops, each of said one or more stops including one or more apertures for slidably engaging said one or more guide pins;
   wherein each of said one or more stops engages one or more of said guide pins and is positioned adjacent at least one of said guide pin receivers to prevent the movement of said guide pin receivers relative to said guide pins.

* * * * *